(12) United States Patent
Malik et al.

(10) Patent No.: US 11,439,946 B2
(45) Date of Patent: Sep. 13, 2022

(54) MIXED BEAD LAYERING ARRANGEMENT FOR THERMAL SWING ADSORPTION APPLICATION

(71) Applicant: Air Products and Chemicals, Inc., Allentown, PA (US)

(72) Inventors: Nasim Ul Hassan Malik, London (GB); King Wai Hung, Surbiton (GB); Gowri Krishnamurthy, Sellersville, PA (US); William T. Kleinberg, Emmaus, PA (US); Garrett C. Lau, New Tripoli, PA (US); Edward Landis Weist, Jr., Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 211 days.

(21) Appl. No.: 17/037,906

(22) Filed: Sep. 30, 2020

(65) Prior Publication Data

US 2022/0096993 A1  Mar. 31, 2022

(51) Int. Cl.
*B01D 53/00* (2006.01)
*B01D 53/04* (2006.01)

(52) U.S. Cl.
CPC ..... *B01D 53/0462* (2013.01); *B01D 53/0438* (2013.01); *B01D 2253/1085* (2013.01); *B01D 2257/404* (2013.01); *B01D 2257/504* (2013.01); *B01D 2257/702* (2013.01)

(58) Field of Classification Search
CPC ........................ B01D 2253/30; B01D 53/0438; B01D 53/0462; B01D 2253/104; B01D 2253/108; B01D 2257/504; B01D 2257/80; B01D 2259/4143; B01D 53/047; B01J 20/28004; B01J 20/28021; B01J 20/28023; B01J 20/28052
See application file for complete search history.

(56) References Cited

U.S. PATENT DOCUMENTS

| 4,964,888 | A | 10/1990 | Miller |
| 5,728,198 | A | 3/1998 | Acharya et al. |
| 6,027,548 | A | 2/2000 | Ackley et al. |
| 7,713,333 | B2 * | 5/2010 | Rege ............... B01D 53/047 96/121 |
| 2003/0200866 | A1 | 10/2003 | Weyrich et al. |
| 2007/0051238 | A1 | 3/2007 | Jain et al. |
| 2017/0087505 | A1 | 3/2017 | Hashi et al. |
| 2018/0214817 | A1 * | 8/2018 | Schurer ............ B01J 20/28052 |

FOREIGN PATENT DOCUMENTS

| EP | 2854989 | | 6/2018 |
| EP | 2803401 | B1 | 7/2018 |

* cited by examiner

*Primary Examiner* — Sharon Pregler
(74) *Attorney, Agent, or Firm* — Matthew R. Weaver

(57) ABSTRACT

An adsorbent vessel for removing contaminants from a feed gas upstream from a cryogenic distillation process using pressure swing adsorption, temperature swing adsorption, or thermal-pressure swing adsorption. The adsorbent vessel having an adsorbent bed comprised of multiple layers of adsorbent material, including two layers of adsorbent material that selective adsorbs carbon dioxide. Each of the two layers is formed from an adsorbent material having a different capacity for adsorbing carbon dioxide.

20 Claims, 3 Drawing Sheets

MIXED BEAD LAYERING ARRANGEMENT FOR THERMAL SWING ADSORPTION APPLICATION

FIELD OF THE INVENTION

The present invention relates generally to a method and apparatus for removing impurities from a feed gas stream by adsorption, particularly by Thermal Swing Adsorption (TSA). Specifically, it relates using a layered combination of adsorbent material with different capacities for the absorbate to minimize capital costs and pressure drop in an adsorption bed and increase the efficiency of the adsorption process.

BACKGROUND OF THE INVENTION

TSA is frequently used in conjunction with technology like Pressure Swing Adsorption (PSA) and Thermal-Pressure Swing Adsorption (TPSA) for air pre-purification in the air cryogenic distillation process. Its function is to remove components with a relatively high freezing point, such as ambient moisture and carbon dioxide. If not removed, these components would otherwise freeze out in the process downstream, causing operability problems like blockages. The air pre-purification adsorption system also removed impurities such as nitrous oxide and hydrocarbons which can raise safety concerns if allowed to accumulate in the downstream processes.

The current practice for TSA air pre-purification is to pass the feed gas through an adsorption bed with a moisture removal layer followed by a carbon dioxide removal layer. The carbon dioxide removal layer is typically a carbon-dioxide selective molecular sieve. The loading arrangement for the molecular sieve layer is a uniform material layer of a uniform capacity for carbon dioxide. Silica gel or activated alumina is commonly used to remove moisture and X type zeolite (such as 13X) is commonly used to remove carbon dioxide, nitrous oxide and some species of hydrocarbons.

The TSA purification process operates in a cyclic manner where one or more adsorption vessels containing the adsorption beds are onstream while one or more vessels are going through regeneration. During the onstream step, compressed process fluid is passed through a bed via the vessel inlet. The targeted undesirable components (absorbates) are then stripped away by different types of adsorbents as the process fluid flows through the vessel, creating a process fluid depleted in the adsorbates. The process fluid depleted in adsorbates is passed to a downstream process through the vessel outlet. After a period of onstream time, the adsorbent will become saturated with adsorbates, at which point the adsorption duty is switched over to a regenerated bed and the saturated bed will go through regeneration. Regeneration is typically performed by passing a heated stream of a fluid that is substantially free of the adsorbates through the adsorbent bad in the opposite direction as the process fluid.

As the process fluid flows through the adsorbent bed, an equilibrium zone and a mass transfer zone are formed within the bed. In the equilibrium zone, the adsorbate in the process fluid is in equilibrium with the adsorbate on the adsorbent and no additional adsorption takes place. In the mass transfer zone, the adsorbent is not yet saturated with adsorbate and adsorption and mass transfer occur.

U.S. Pat. No. 5,728,198 teaches an adsorbent arrangement for a vessel that uses a downward adsorption process flow and an upward regeneration process flow in a TSA process for carbon dioxide removal from air. The CO2 selective layer in this arrangement consist of two layers where the first layer of the material has a larger particle size than the second layer of material.

U.S. Pat. No. 4,964,888 teaches a PSA with product separation application where separation occurs in two adsorption zones. With types of adsorbent utilized in said two adsorption zones changing depending on the product required. The invention also teaches that particle size of adsorption zone 1 should be smaller than the particle size of adsorption zone 2.

U.S. Pat. No. 6,027,548 teaches an adsorbent arrangement for a PSA application for the removal of hydrocarbon and carbon dioxide from a nitrogen stream where the equilibrium zone is a mixture of a strong and weak adsorbent. The strong adsorbent can be LiX, NaX, NaY and the weak adsorbent can be alumina and NaX.

The pressure drop incurred by the adsorption bed is heavily related to the particle size of the adsorbent material and the adsorbent layer thickness. Additional pressure drop is also added to the unit operation when any size other than large particle size is used in the equilibrium zone as the particle size of a material has less of an impact in the equilibrium zone than the impact it has on the mass transfer zone.

The cost of molecular sieve material increases incrementally at a significantly greater rate than its capacity for the adsorbate. Thus, there exists an unmet need for adsorption arrangements that can maximize purification capacity and efficiency while minimizing capital costs and pressure drop.

SUMMARY

Aspect 1: An apparatus for removing at least one contaminant from a gaseous feed stream, the at least one contaminant comprising carbon dioxide, the apparatus comprising:

at least one adsorbent vessel comprising an adsorbent bed, an inlet, and an outlet, the adsorbent bed comprising a plurality of layers, the plurality of layers comprising a first layer formed from a first adsorbent material that is capable of selectively adsorbing the at least one contaminant at a first temperature and selectively desorbing the at least one contaminant at a second temperature, and a second layer formed from a second adsorbent material that is capable of selectively adsorbing the at least one contaminant at the first temperature and selectively desorbing the at least one contaminant at third temperature;

wherein the second and third temperatures are both higher than the first temperature;

wherein the arrangement of the plurality of layers from the inlet to the outlet comprises the first layer, then the second layer;

wherein the first adsorbent material has a greater adsorption capacity for the at least one contaminant than the second adsorbent material; and wherein the adsorbent bed has an equilibrium zone and a mass transfer zone, wherein the first layer is located within the equilibrium zone and the second layer is located within the mass transfer zone.

Aspect 2: The apparatus of claim 1, wherein the at least one contaminant further comprises nitrous oxide and hydrocarbons.

Aspect 3: The apparatus of any of claims 1-2, wherein the first adsorbent material has a greater adsorption capacity for carbon dioxide than the second adsorbent material.

Aspect 4: The apparatus of any of claims 1-3, wherein the first adsorbent material has a first average particle size and the second adsorbent material has a second average particle size, the first average particle size being greater than the second average particle size.

Aspect 5: The apparatus of claim 4, wherein the first adsorbent material has an average particle size of at least 3.5 mm and the second adsorbent material has an average particle size that is less than 2.5 mm.

Aspect 6: The apparatus of any of claims 1-5, wherein the first adsorbent material has an Si/Al ratio in the range of 1.0-1.2 and the second adsorbent material has an Si/Al ratio of 1.2-1.5, the Si/Al ratio of the first adsorbent material being lower than the Si/Al ratio of the second adsorbent material.

Aspect 7: The apparatus of any of claims 1-6, wherein the first adsorbent material is cation exchanged 13X having an Si/Al ratio in the range of 1.0 to 1.2 and the second adsorbent material is cation exchanged 13X having and Si/Al ratio in the range of 1.2 to 1.5.

Aspect 8: The apparatus of any of claims 1-7, wherein the first adsorbent material comprises an adsorption capacity of from 1.1 to 1.6 and the second adsorbent material comprises an adsorption capacity of from 1.0 to 1.2.

Aspect 9: The apparatus of any of claims 1-8, wherein the plurality of layers further comprises a third layer formed from a third adsorbent material that is capable of selectively adsorbing moisture at the first temperature and selectively desorbing moisture at a fourth temperature, the fourth temperature being higher than the first temperature, wherein the arrangement of the plurality of layers from the inlet to the outlet comprises the third layer, the first layer, then the second layer.

Aspect 10: The apparatus of any of claims 1-9, wherein the first layer has a first layer length, and the second layer has a second layer length, wherein the second layer length is in the range of 10-50% of a sum of the second layer length and the first layer length.

Aspect 11: A system comprising: a feed conduit in fluid flow communication with air, the feed conduit being adapted to supply the air to at least one adsorbent vessel at a feed temperature;

at least one adsorbent vessel having an inlet, an adsorbent bed, and an outlet, the inlet being in fluid flow communication with the feed conduit, the adsorbent bed comprising a plurality of layers, the plurality of layers comprising a first layer formed from a first adsorbent material that is capable of selectively adsorbing at least one contaminant at a first temperature and selectively desorbing the at least one contaminant at a second temperature, and a second layer formed from a second adsorbent material that is capable of selectively adsorbing the at least one contaminant at the first temperature and selectively desorbing the at least one contaminant at a third temperature;

a cryogenic distillation subsystem in fluid flow communication with the outlet of the at least one adsorbent vessel;

a regeneration conduit in fluid flow communication with the outlet of the at least one adsorbent vessel, the regeneration conduit being adapted to supply a regeneration gas at a regeneration temperature, the regeneration temperature being higher than the feed temperature;

wherein the arrangement of the plurality of layers between the inlet and outlet consists of the first layer and the second layer;

wherein the second and third temperatures are both higher than the first temperature;

wherein the arrangement of the plurality of layers from the inlet to the outlet comprises the first layer, then the second layer;

wherein the first adsorbent material has a greater adsorption capacity for at least one contaminant than the second adsorbent material; and wherein the adsorbent bed has an equilibrium zone and a mass transfer zone, wherein the first layer is located within the equilibrium zone and the second layer is located within the mass transfer zone.

Aspect 12: The system of claim 11, wherein the at least one contaminant further comprises nitrous oxide and hydrocarbons.

Aspect 13: The system of any of claims 11-12, wherein the first adsorbent material has a greater adsorption capacity for carbon dioxide than the second adsorbent material.

Aspect 14: The system of any of claims 11-13, wherein the first adsorbent material has a first average particle size and the second adsorbent material has a second average particle size, the first average particle size being greater than the second average particle size.

Aspect 15: The system of claim 14, wherein the first adsorbent material has an average particle size of at least 3.5 mm and the second adsorbent material has an average particle size that is less than 2.5 mm.

Aspect 16: The system of any of claims 11-15, wherein the first adsorbent material has an Si/Al ratio in the range of 1.0-1.2 and the second adsorbent material has an Si/Al ratio of 1.2-1.5, the Si/Al ratio of the first adsorbent material being lower than the Si/Al ratio of the second adsorbent material.

Aspect 17: The system of any of claims 11-16, wherein the first adsorbent material is cation exchanged 13X having an Si/Al ratio in the range of 1.0 to 1.2 and the second adsorbent material is cation exchanged 13X having and Si/Al ratio in the range of 1.2 to 1.5.

Aspect 18: The system of any of claims 11-17, wherein the first adsorbent material comprises an adsorption capacity of from 1.1 to 1.6 and the second adsorbent material comprises an adsorption capacity of from 1.0 to 1.2.

Aspect 19: The system of any of claims 11-18, wherein the plurality of layers further comprises a third layer formed from a third adsorbent material that is capable of selectively adsorbing moisture at the first temperature and selectively desorbing moisture at a fourth temperature, the fourth temperature being higher than the first temperature, wherein the arrangement of the plurality of layers from the inlet to the outlet comprises the third layer, the first layer, then the second layer.

Aspect 20: The system of any of claims 11-19, wherein the first layer has a first layer length, and the second layer has a second layer length, wherein the second layer length is in the range of 10-50% of a sum of the second layer length and the first layer length.

Aspect 21: The system of any of claims 11-20, further comprising a cooling system operationally configured to cool the air prior to the air entering the at least one adsorbent vessel.

Aspect 22: The system of claim 21, wherein the cooling system comprises a direct contact aftercooler.

Aspect 23: The system of claim 21, wherein the cooling system comprises a mechanical chiller.

Aspect 24: A method comprising:

(a) forming a plurality of layers of adsorbent material in an adsorbent bed of each of at least one adsorbent vessel, the at least one adsorbent vessel having an inlet and an outlet, the plurality of layers of adsorbent material comprising a first layer formed from a first adsorbent material that is capable of selectively adsorbing at least one contaminant at a first temperature and selectively desorbing the at least one contaminant at a second temperature, and a second layer formed from a second adsorbent material that is capable of selectively adsorbing the at least one contaminant at the first temperature and selectively desorbing the at least one contaminant at a third temperature, wherein the first layer is located in an equilibrium zone for the adsorbent bed and the second layer is located in a mass transfer zone of the adsorbent bed, wherein the second and third temperatures are both higher than the first temperature, wherein the arrangement of the plurality of layers from the inlet to the outlet comprises the first layer, then the second layer, wherein the first adsorbent material has a greater adsorption capacity for the at least one contaminant than the second adsorbent material, and wherein the at least one contaminant comprises carbon dioxide.

Aspect 25: The method of claim 24, further comprising:

(b) selectively adsorbing the at least one contaminant from a gaseous feed stream by flowing the gaseous feed stream at a feed temperature through at least one adsorbent vessel, thereby forming a purified stream; and (c) regenerating the adsorbent bed by flowing a regeneration stream through the at least one adsorbent vessel in a direction opposite to that of the gaseous feed stream of step (b) at a regeneration temperature that is greater that the feed temperature, resulting in desorption of the at least one contaminant from the adsorbent bed to the regeneration stream.

Aspect 26: The method of any of claims 24-25, further comprising:

(d) supplying the purified stream to a cryogenic distillation subsystem in fluid flow communication with the outlet of the at least one adsorbent vessel.

Aspect 27: The method of any of claims 24-26, wherein the first adsorbent material has a greater adsorption capacity for carbon dioxide than the second adsorbent material.

Embodiments of this invention present an adsorbent layering arrangement to optimize adsorbent utilization in an adsorption system used to provide pre-purification in cryogenic distillation of air. The layering arrangement relates to the carbon dioxide removal layer of the bed where adsorbent in this layer consists of molecular sieve. The carbon dioxide removal layer divided into at least two layers, at least one loaded with a type of strong molecular sieve and at least one other with a type of weak molecular sieve. The strong molecular sieve possesses a higher carbon dioxide capacity compared to the weak molecular sieve. The adsorbent bed is arranged so process fluid flows through the high capacity adsorbent layer prior to the lower capacity adsorbent layer. An equilibrium zone is formed in the high capacity layer and a mass transfer zone is formed in the lower capacity layer. The quantity of strong adsorbent required is defined by the length of equilibrium zone while the quantity required for the weak adsorbent is defined by the length of the mass transfer zone. The adsorbent particle size of the stronger material is to be greater than the weaker material.

Embodiments of this invention present an adsorbent layering arrangement to optimize adsorbent utilization in an adsorption system used to provide pre-purification in cryogenic distillation of air. The layering arrangement relates to the carbon dioxide removal layer of the bed where adsorbent in this layer consists of molecular sieve. The carbon dioxide removal layer divided into at least two layers, at least one loaded with a type of strong molecular sieve and at least one other with a type of weak molecular sieve. The strong molecular sieve possesses a higher carbon dioxide capacity compared to the weak molecular sieve. The adsorbent bed is arranged so process fluid flows through the high capacity adsorbent layer prior to the lower capacity adsorbent layer. An equilibrium zone is formed in the high capacity layer and a mass transfer zone is formed in the lower capacity layer. The quantity of strong adsorbent required is defined by the length of equilibrium zone while the quantity required for the weak adsorbent is defined by the length of the mass transfer zone. The adsorbent particle size of the stronger material is to be greater than the weaker material.

BRIEF DESCRIPTION OF THE DRAWINGS

The present invention will hereinafter be described in conjunction with the appended drawing figures wherein like numerals denote like elements.

DETAILED DESCRIPTION

Figure 1:
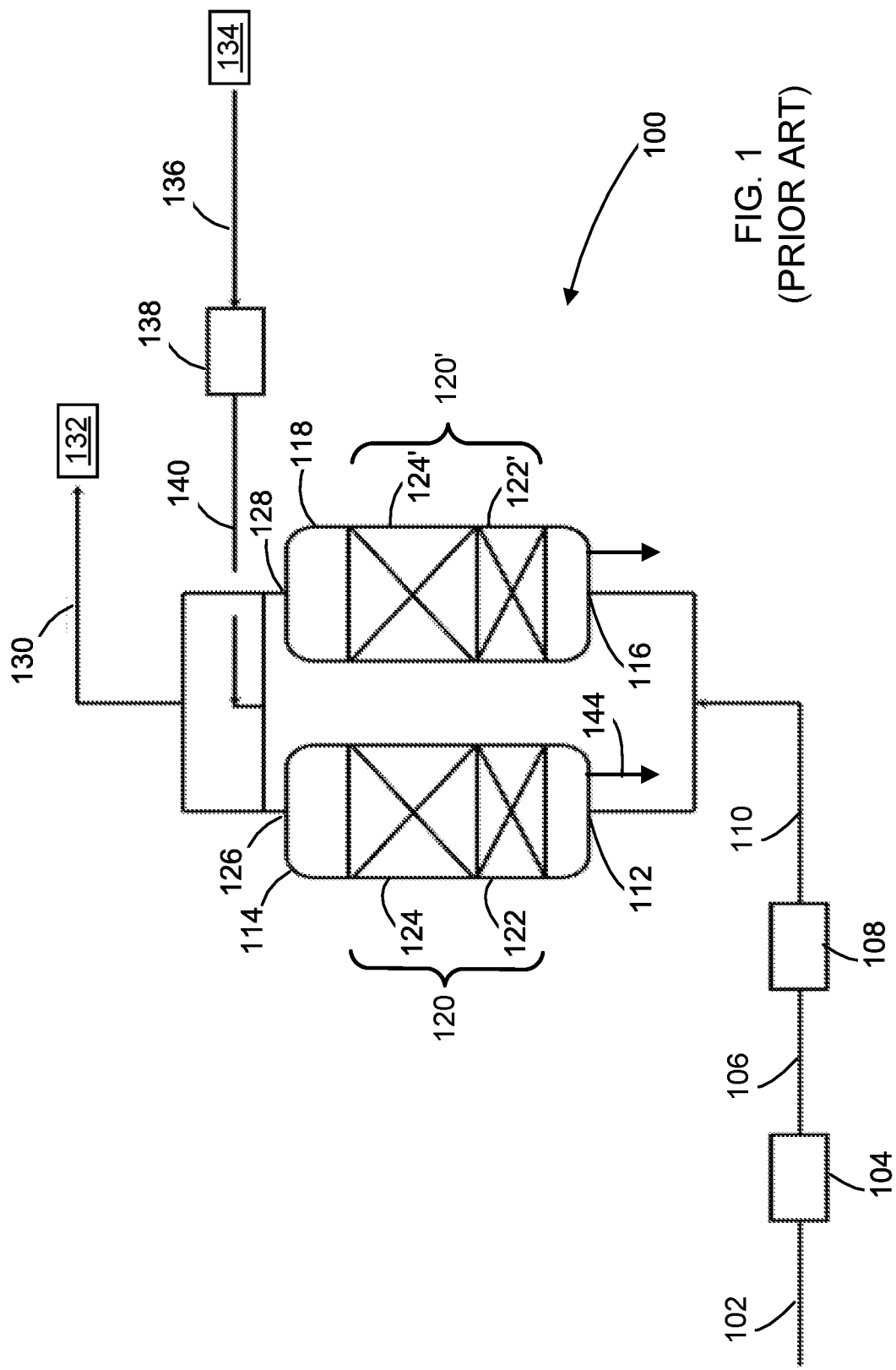
FIG. 1 is a prior art thermal swing adsorption process for cryogenic air distillation.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Reference numerals that are introduced in the specification in association with a drawing figure may be repeated in one or more subsequent figures without additional description in the specification in order to provide context for other features.

In the claims, letters are used to identify claimed steps (e.g. (a), (b), and (c)). These letters are used to aid in referring to the method steps and are not intended to indicate the order in which claimed steps are performed, unless and only to the extent that such order is specifically recited in the claims.

Directional terms may be used in the specification and claims to describe portions of the present invention (e.g., upper, lower, left, right, etc.). These directional terms are merely intended to assist in describing exemplary embodiments and are not intended to limit the scope of the claimed invention. As used herein, the term "upstream" is intended to mean in a direction that is opposite the direction of flow of a fluid in a conduit from a point of reference. Similarly, the term "downstream" is intended to mean in a direction that is the same as the direction of flow of a fluid in a conduit from a point of reference.

Unless otherwise stated herein, any and all percentages identified in the specification, drawings and claims should be understood to be on a weight percentage basis. Unless otherwise stated herein, any and all pressures identified in the specification, drawings and claims should be understood to mean gauge pressure.

The term "fluid flow communication," as used in the specification and claims, refers to the nature of connectivity between two or more components that enables liquids, vapors, and/or two-phase mixtures to be transported between the components in a controlled fashion (i.e., without leakage) either directly or indirectly. Coupling two or more components such that they are in fluid flow communication with each other can involve any suitable method known in the art, such as with the use of welds, flanged conduits, gaskets, and bolts. Two or more components may also be coupled together via other components of the system that may separate them, for example, valves, gates, or other devices that may selectively restrict or direct fluid flow.

The term "equilibrium zone", as used in the specification and claims means the portion of the length of an adsorbent bed in which the adsorbate concentration is equal to the adsorbate concentration in the fluid to be purified.

The term "mass transfer zone", as used in the specification and claims means the portion of the length of an adsorbent bed in which the adsorbate concentration profile decreases from adsorbate concentration in the fluid to be purified to the adsorbate concentration desired within the process. The adsorbate concentration profile within the adsorbent bed can be determined by measuring the adsorbent concentration versus time as it exits the bed (often referred to in the art as a breakthrough test).

The term "adsorption capacity", as used in the specification and claims means the ratio of adsorbate captured or removed to adsorbent under process conditions. Unless otherwise specified, the ratio is on a mass basis.

The term "conduit", as used in the specification and claims, refers to one or more structures through which fluids can be transported between two or more components of a system. For example, conduits can include pipes, ducts, passageways, and combinations thereof that transport liquids, vapors, and/or gases.

The term "particle size," as used in the specification and claims to describe an adsorbent material, is intended to mean the average particle size of the adsorbent material. In the art, an average particle size is often measured by passing adsorbent particles through a series of wire mesh screens having different known mesh sizes. A calculated weighted average is determined by the fraction of the adsorbent that is retained on each mesh size.

FIG. 1 shows an embodiment of a conventional TSA pre-purification system 100 for cryogenic air distillation. It should be noted that, the inventive concepts disclosed herein could be used with any suitable type of adsorption system, including TSA, PSA, and TPSA. It should also be noted that the improved adsorption systems and methods disclosed herein could be beneficially applied to other applications, such as [examples]. The improved adsorption systems and methods disclosed herein are not limited to air pre-purification alone and may also be used for other gas purification by adsorption applications, such as CO2 capture and purification of other gases such as hydrogen, nitrogen, oxygen, etc.

A gaseous feed stream 102 (in this case, ambient air) is compressed by compressor 104 to form a compressed feed stream 106. In order to improve the adsorption process and/or reduce moisture content, the compressed feed stream 106 is optionally cooled by a cooling unit 108 such as a direct contact aftercooler or mechanical chiller to form a cooled feed stream 110. The temperature to which the cooled feed stream 110 is cooled will depend upon the specific application, but it is generally desirable to cool to between 5 and 20 degrees C. The cooled feed stream 110 enters an inlet 112, 116 of each of the adsorption vessels 114, 118. In this example, two adsorption vessels 114, 118 are operated in parallel. As is known in the art, several other configurations are possible, such as a single adsorption vessel, any number of adsorption vessels operated in parallel, as well as a plurality of adsorption vessels operated in a parallel, but with staggered operational stages for continuous operation (e.g., operating adsorption vessel 114 in an adsorption step while adsorption vessel 118 is being purged and regenerated).

Figure 2:
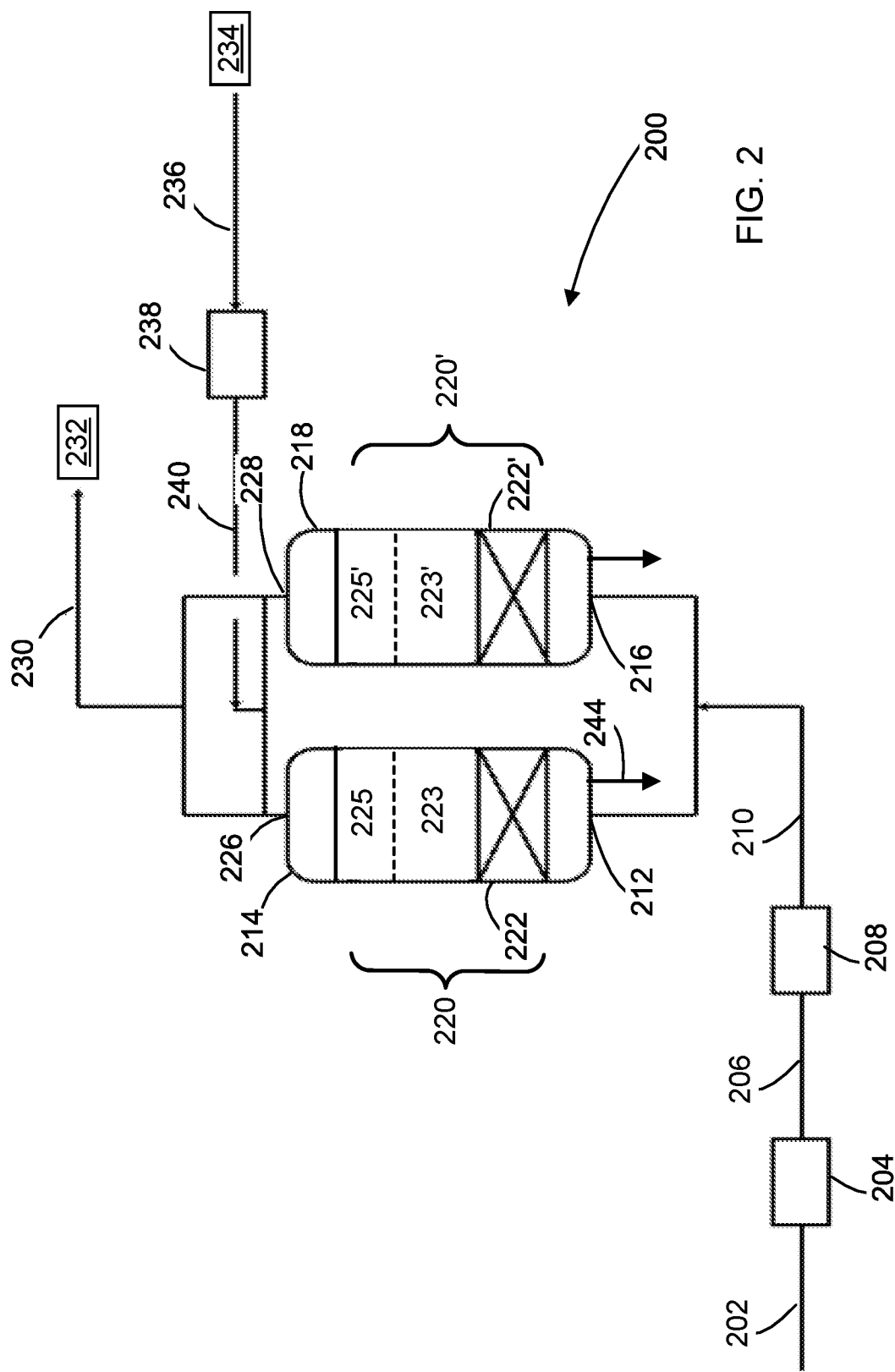
FIG. 2 is an embodiment of an adsorption system according to the claimed invention with two or more adsorption vessels in parallel.

In FIG. 2, the adsorption vessels 114, 118 are shown in a vertical orientation and the cooled feed stream 110 enters the adsorption vessel 114, 118 at the bottom. In other embodiments, other vessel configurations could be used, such as horizontal or radial orientation of the adsorption vessels and top feed of vertically oriented adsorption vessels. As the cooled feed stream 110 passes through an adsorption bed 120, 120', adsorbates such as ambient moisture, carbon dioxide, nitrous oxide and other hydrocarbon components are adsorbed by the adsorbent and removed from the cooled feed stream 110. In the descriptions below In this embodiment, the adsorption bed 120, 120' comprises a moisture removal layer 122, 122' comprising an adsorbent that selectively removes ambient moisture and a carbon dioxide removal layer 124, 124' comprising an adsorbent that selectively removes carbon dioxide as well as nitrous oxide and hydrocarbons from the air feed. The adsorbent material being used in the moisture removal layers 122, 122' may either be of the same or different material as the carbon dioxide removal layers 124, 124'. Silica gel or activated alumina is commonly used to remove moisture and X type zeolite (such as 13X) is commonly used to remove carbon dioxide, nitrous oxide and some species of hydrocarbons. At the vessel outlets 126, 128, a purified feed 130, depleted in the adsorbates, exits the TSA purification system 100 and is fed into a downstream cryogenic distillation process 132. An example of cryogenic distillation process 132 is disclosed in U.S. Pat. No. 6,651,460, which is hereby incorporated by reference.

When an adsorption bed 120 becomes "spent" (approaching the limit of its ability to adsorb the adsorbate), it is taken offline and regenerated. The regeneration process may start by reducing the pressure in the adsorption vessel 114. A waste stream 136 from the cryogenic distillation process 134, that is substantially free (typically less than 0.1% by weight of absorbates) of the absorbates removed during the adsorption step (ambient moisture, carbon dioxide, nitrous oxide and hydrocarbons), is heated by a heater 138 to at least 150 degrees Celsius to produce a heated regeneration stream 140. The heater 138 may be a heat exchange device such as an electric heater, steam heater or gas fired heater. The heated regeneration stream 140 enters the adsorption vessel 114 via the outlet 126, 128 in the opposite direction of flow of during adsorption. The heated regeneration stream 140 desorbs the adsorbates from the adsorbent material and carries them out of the adsorption vessel (see regeneration outlet 144). When the adsorption bed 120 has been regenerated, the heater 138 is deactivated, allowing an unheated regeneration stream 140 to flow through the adsorption bed 120 until it cools to a pre-determined temperature (typically in the range of 5 to 25 degrees C. warmer than the cooled feed temperature). The adsorption vessel 114 is then repressured and adsorption is resumed by restoring the flow of the cooled feed stream 110 through the adsorption bed 120. Optionally, purification duty may be shared for a period of time between an adsorption bed 120 that is coming back online from regeneration and another adsorption bed 120' that is spent, after which the spent adsorption bed 120' is transitioned to the regeneration process.

FIG. 2 represents an exemplary embodiment a TSA system 200 for cryogenic air distillation according to the current invention. In this embodiment, elements shared with the first embodiment (FIG. 1) are represented by reference numerals increased by a factor of 100. For example, the gaseous feed stream 102 of FIG. 1 corresponds to a gaseous feed stream 202 of FIG. 2. In the interest of avoiding repetition of specification, some features of this embodiment that are shared with the first embodiment are numbered in FIG. 2 but are not repeated in the specification.

In this embodiment, each adsorbent bed 220, 220' comprises a moisture removal layer 222, 222', a first carbon dioxide removal layer 223, 223' and a second carbon dioxide removal layer 225, 225'. As in the first embodiment, the moisture removal layer 222, 222' comprises and adsorbent that selectively removes ambient moisture from the cooled feed stream 210. The first carbon dioxide removal layer 223, 223' and a second carbon dioxide removal layer 225, 225' each comprise an adsorbent that selectively removes $CO_2$, $N_2O$ and other heavy hydrocarbons from the cooled feed stream 210. The cooled feed stream 210 sequentially flows first through the moisture removal layer, then through the first carbon dioxide removal layer, and then through the second carbon dioxide removal layer.

Figure 3:
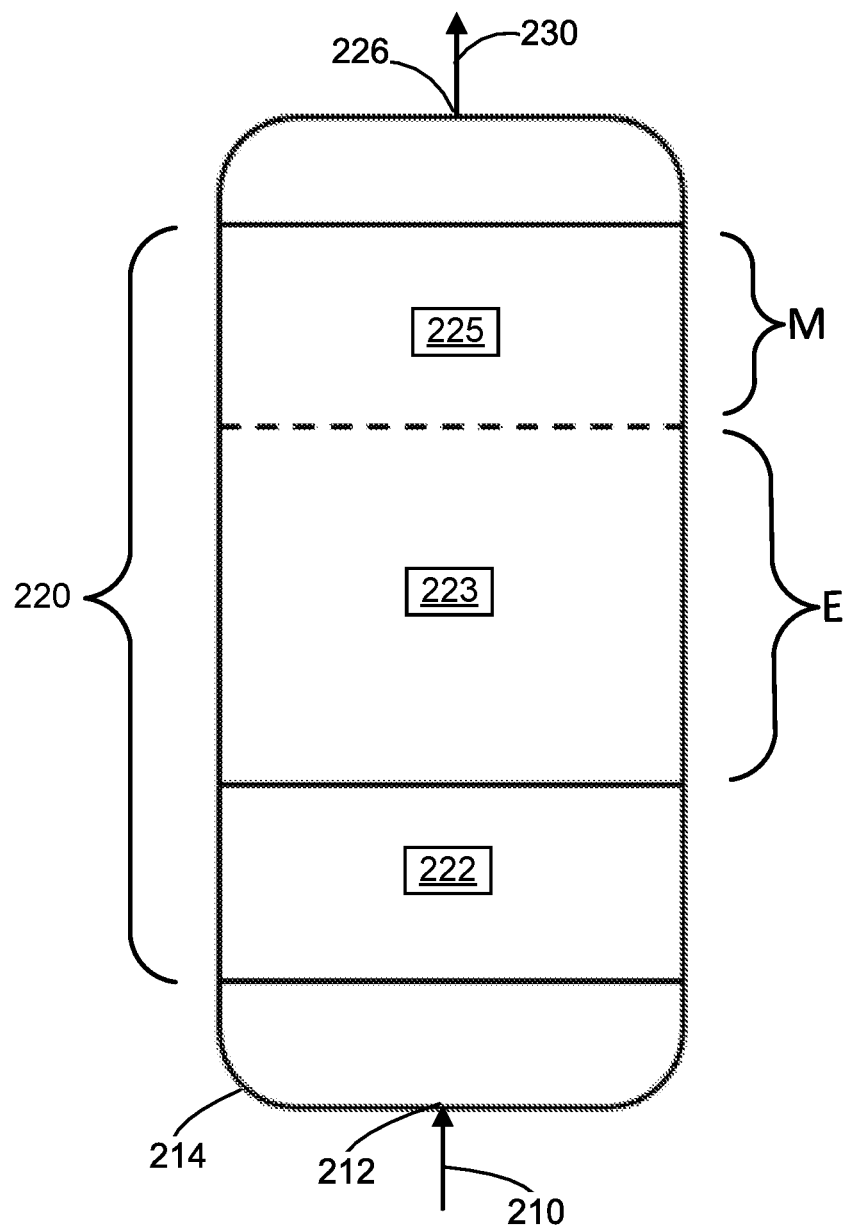
FIG. 3 is a detailed view of the adsorption vessels of the embodiment of FIG. 2.

The layering arrangement described in connection with the system 200 of FIG. 2, is shown in greater detail in FIG. 3. Adsorption vessel 214 is shown in FIG. 3. In this embodiment, adsorption vessel 216 has an identical configuration. As the cooled feed stream 210 flows through the adsorption vessel 214, an equilibrium zone E and a mass transfer zone M forms in the adsorbent bed 220. It should be noted that the descriptions below of the equilibrium zone E and a mass transfer zone M are at a given point in time. As is understood in the art, the characteristics of these zones (e.g., relative lengths, transitional locations, etc.) change over time as long as there continues to be flow through the absorbent.

It is preferable that the first carbon dioxide removal layer 223 have a length equal to the length of the equilibrium zone and that the second carbon dioxide removal layer 225 have a length equal to the length of mass transfer zone M. It should be understood that in the context of the adsorbent bed 220, the length dimension is parallel to the general direction of flow of the cooled feed stream 210 through the adsorbent bed 220, which is vertical in FIG. 3. In many applications, the length of the mass transfer zone M will be in the range of 10-50% of the sum of the lengths of the mass transfer zone M and the equilibrium zone E.

The position and length of the mass transfer zone M is dependent on several factors, including pressure, temperature, mass flux, adsorbate concentration, in the fluid being purified, type of adsorbent, particle size of the adsorbent, and the adsorbent's capacity for $CO_2$. Generally, adsorbents having smaller particle sizes provide a smaller (shorter) mass transfer zone and hence, more efficient utilization of the adsorbent bed 220. Unfortunately, the user of smaller particle sizes results in a larger pressure drop and also can result in early onset of fluidization issues. Therefore, it is not desirable to use the smaller particles for the entire molecular sieve layer.

In the equilibrium zone E, which is typically between one-half and two-thirds of the total molecular sieve bed length, the capacity of the adsorbent material for the adsorbate has a great influence on purification process. In contrast, in the mass transfer zone M, its length is less influenced by the adsorbent capacity than the equilibrium zone E but it is still impacted by the particle size of the adsorbent. A higher capacity adsorbent will generally allow for a shorter equilibrium zone E, which is more efficient and allows for the use of less adsorbent. Using adsorbent material with a smaller particle size in the mass transfer zone M would be expected to shorten the overall bed length due to improved kinetics and reduce size of the mass transfer zone M. The inventors unexpectedly discovered that using a lower capacity adsorbent the mass transfer zone M did not negatively affect the overall mass transfer of the bed.

In this embodiment, the adsorbent material in the first carbon dioxide removal layer 223 has a higher $CO_2$ adsorption capacity than the adsorbent in the second carbon dioxide removal layer 225. The first carbon dioxide removal layer 223 has a $CO_2$ adsorption capacity that is preferably greater than, more preferably at least 10% greater than, and, most preferably, at least 20% greater than, the $CO_2$ adsorption capacity of the adsorbent in the second carbon dioxide removal layer 225. In most embodiments, the first carbon dioxide removal layer 223 has a $CO_2$ adsorption capacity that is 10-30% greater, than the adsorbent in the second carbon dioxide removal layer 225.

The $CO_2$ adsorption capacity of an adsorbent is also related to the Silicon to Aluminum ratio ("Si/Al ratio") in the adsorbent. Accordingly, it is preferable that first carbon dioxide removal layer 223 have an Si/Al ratio in the range of 1.0-1.2 and the adsorbent in the second carbon dioxide removal layer 225 have an Si/Al ratio in the range of 1.2-1.5. It is also preferable that the Si/Al ratio in the first carbon dioxide removal layer 223 be at least 10% lower than the Si/Al ratio of the second carbon dioxide removal layer 225.

In addition, the first carbon dioxide removal layer 223 preferably has a larger average particle size than the adsorbent in the second carbon dioxide removal layer 225. Preferably, the average particle size for the first carbon dioxide removal layer 223 is at least 3.5 mm and, more preferable, between 3.5 and 5 mm. Preferably, the average particle size for the second carbon dioxide removal layer 225 is no greater than 2.5 mm and, more preferable, between 1.0 and 2.5 mm.

A preferred high capacity adsorbent material for the first carbon dioxide removal layer is sodium exchanged medium silicon or low silicon 13X. A preferred adsorbent material for the second carbon dioxide removal layer is zeolite 13X, which is different from the first layer in that it contains higher silicon content and/or is non-sodium exchanged. High capacity adsorbent carries a higher cost than the lower cost adsorbent, although it may lower the amount of adsorbent needed. In prior art methods, the entire molecular sieve layer comprises the high capacity adsorbent, which results in a higher capital cost for the system.

The inventors discovered that this combination of $CO_2$ adsorbent layers allows for a significant reduction in capital expenses associated with the adsorbent bed 220 by reducing the quantity of high-capacity molecular sieve material—without sacrificing adsorption performance.

Examples

The tables below show data for three different sets of plant conditions, each with a configuration having a single-layer CO2 adsorbent (labeled "Default") and a configuration having two layers of CO2 adsorbent (labeled "Mix Layered"). In each example, the high capacity CO2 adsorbent in the "Default" configuration has a Si/Al ratio of 1.0 to 1.2, having an average particle size of 2.5 to 3.5. In the Mixed Layer configuration, the high capacity CO2 adsorbent has a Si/Al ratio of 1.0 to 1.2, having an average particle size of 3.5 mm to 5.0 mm and the regular capacity CO2 adsorbent has a Si/Al ratio of 1.2 to 1.5, having an average particle size of 1.0 mm to 2.5 mm.

TABLE 1

| Plant | A | |
|---|---|---|
| Vessel Configuration | Vertical | |
| Flowrate | 77000 Nm3/hr | |
| Temperature | 44 deg C. | |
| Case | Default | Mix Layered |
| Material Requirement | High Capacity: 11800 kg | High Capacity: 8000 kg |
| | Regular Capacity: 0 kg | Regular Capacity: 3800 kg |
| Layer dP | Feed: 24 mbar | Feed: 20 mbar |
| | Regen: 35 mbar | Regen: 29 mbar |

TABLE 2

| Plant | B | |
|---|---|---|
| Vessel Configuration | Horizontal | |
| Flowrate | 326000 Nm3/hr | |
| Temperature | 18 deg C. | |
| Case | Default | Mix Layered |
| Material Requirement | High Capacity: 50900 kg | High Capacity: 36600 kg |
| | Regular Capacity: 0 kg | Regular Capacity: 14100 kg |
| Layer dP | Feed: 33 mbar | Feed: 28 mbar |
| | Regen: 13 mbar | Regen: 10 mbar |

TABLE 3

| Plant | C | |
|---|---|---|
| Vessel Configuration | Horizontal | |
| Flowrate | 533000 Nm3/hr | |
| Temperature | 34 deg C. | |
| Case | Default | Mix Layered |
| Material Requirement | High Capacity: 70000 kg | High Capacity: 46000 kg |
| | Regular Capacity: 0 kg | Regular Capacity: 23000 kg |
| Layer dP | Feed: 19 mbar | Feed: 17 mbar |
| | Regen: 12 mbar | Regen: 11 mbar |

As shown in each of these examples, the mix layered configuration enables the system to operate with a significantly reduced amount of high-capacity adsorbent and with a reduced pressure drop across the adsorption vessel, without a reduction in purification capacity. In the examples shown above, a 5% reduction in adsorbent cost and a power savings of 10-20% (due to reduced pressure drop) were realized.

The application of this layering technique can also be applied to operating plants during an upset scenario. Such upset scenarios include, but are not limited to, an adsorbent leak causing the adsorbent level to decrease within the vessel or adsorbate breaking through into downstream process. In such scenarios, basic 13X material can be added on top of the existing layer despite the existing layer consist of higher capacity material (subjected to the satisfaction of fluidization criteria). The lower cost and the more readily available nature of the basic 13X results in a reduced associated with the implementation of temporary remedial measures, as well as a reduced cost associated the onsite storage of the adsorbent needed to implement such measures. Another benefit of using a low CO2 capacity adsorbent as a surface layer (MTZ) is the ability to regenerate and recover CO2 capacity at a lower temperature than a high CO2 capacity material if the adsorbent material in the product end of the vessel becomes contaminated with moisture (i.e., due to a steam heater leak, etc.).

While the principles of the invention have been described above in connection with preferred embodiments, it is to be clearly understood that this description is made only by way of example and not as a limitation of the scope of the invention.

What is claimed is:

1. An apparatus for removing at least one contaminant from a gaseous feed stream, the at least one contaminant comprising carbon dioxide, the apparatus comprising:
    at least one adsorbent vessel comprising an adsorbent bed, an inlet, and an outlet, the adsorbent bed comprising a plurality of layers, the plurality of layers comprising a first layer formed from a first adsorbent material that is capable of selectively adsorbing the at least one contaminant at a first temperature and selectively desorbing the at least one contaminant at a second temperature, and a second layer formed from a second adsorbent material that is capable of selectively adsorbing the at least one contaminant at the first temperature and selectively desorbing the at least one contaminant at a third temperature;
    wherein the second and third temperatures are both higher than the first temperature;
    wherein the arrangement of the plurality of layers from the inlet to the outlet comprises the first layer, then the second layer;
    wherein the first adsorbent material has a greater adsorption capacity for the at least one contaminant than the second adsorbent material; and
    wherein the adsorbent bed has an equilibrium zone and a mass transfer zone, wherein the first layer is located within the equilibrium zone and the second layer is located within the mass transfer zone.

2. The apparatus of claim 1, wherein the at least one contaminant further comprises nitrous oxide and hydrocarbons.

3. The apparatus of claim 1, wherein the first adsorbent material has a greater adsorption capacity for carbon dioxide than the second adsorbent material.

4. The apparatus of claim 1, wherein the first adsorbent material has a first average particle size and the second adsorbent material has a second average particle size, the first average particle size being greater than the second average particle size.

5. The apparatus of claim 1, wherein the first adsorbent material has an Si/Al ratio in the range of 1.0-1.2 and the second adsorbent material has an Si/Al ratio of 1.2-1.5, the Si/Al ratio of the first adsorbent material being lower than the Si/Al ratio of the second adsorbent material.

6. The apparatus of claim 1, wherein the plurality of layers further comprises a third layer formed from a third adsorbent material that is capable of selectively adsorbing moisture at the first temperature and selectively desorbing moisture at a fourth temperature, the fourth temperature being higher than the first temperature, wherein the arrangement of the plurality of layers from the inlet to the outlet comprises the third layer, the first layer, then the second layer.

7. The apparatus of claim 1, wherein the first layer has a first layer length, and the second layer has a second layer length, wherein the second layer length is in the range of 10-50% of a sum of the second layer length and the first layer length.

8. A system comprising:
a feed conduit in fluid flow communication with air, the feed conduit being adapted to supply the air to at least one adsorbent vessel at a feed temperature;
at least one adsorbent vessel having an inlet, an adsorbent bed, and an outlet, the inlet being in fluid flow communication with the feed conduit, the adsorbent bed comprising a plurality of layers, the plurality of layers comprising a first layer formed from a first adsorbent material that is capable of selectively adsorbing at least one contaminant at a first temperature and selectively desorbing the at least one contaminant at a second temperature, and a second layer formed from a second adsorbent material that is capable of selectively adsorbing the at least one contaminant at the first temperature and selectively desorbing the at least one contaminant at a third temperature;
a cryogenic distillation subsystem in fluid flow communication with the outlet of the at least one adsorbent vessel;
a regeneration conduit in fluid flow communication with the outlet of the at least one adsorbent vessel, the regeneration conduit being adapted to supply a regeneration gas at a regeneration temperature, the regeneration temperature being higher than the feed temperature;
wherein the arrangement of the plurality of layers between the inlet and outlet consists of the first layer and the second layer;
wherein the second and third temperatures are both higher than the first temperature;
wherein the arrangement of the plurality of layers from the inlet to the outlet comprises the first layer, then the second layer;
wherein the first adsorbent material has a greater adsorption capacity for at least one contaminant than the second adsorbent material; and
wherein the adsorbent bed has an equilibrium zone and a mass transfer zone, wherein the first layer is located within the equilibrium zone and the second layer is located within the mass transfer zone.

9. The system of claim 8, wherein the at least one contaminant further comprises nitrous oxide and hydrocarbons.

10. The system of claim 8, wherein the first adsorbent material has a greater adsorption capacity for carbon dioxide than the second adsorbent material.

11. The system of claim 8, wherein the first adsorbent material has a first average particle size and the second adsorbent material has a second average particle size, the first average particle size being greater than the second average particle size.

12. The system of claim 8, wherein the first adsorbent material has an Si/Al ratio in the range of 1.0-1.2 and the second adsorbent material has an Si/Al ratio of 1.2-1.5, the Si/Al ratio of the first adsorbent material being lower than the Si/Al ratio of the second adsorbent material.

13. The system of claim 8, wherein the first adsorbent material comprises an adsorption capacity of from 1.1 to 1.6 and the second adsorbent material comprises an adsorption capacity of from 1.0 to 1.2.

14. The system of claim 8, wherein the plurality of layers further comprises a third layer formed from a third adsorbent material that is capable of selectively adsorbing moisture at the first temperature and selectively desorbing moisture at a fourth temperature, the fourth temperature being higher than the first temperature, wherein the arrangement of the plurality of layers from the inlet to the outlet comprises the third layer, the first layer, then the second layer.

15. The system of claim 8, wherein the first layer has a first layer length, and the second layer has a second layer length, wherein the second layer length is in the range of 10-50% of a sum of the second layer length and the first layer length.

16. The system of claim 8, further comprising a cooling system operationally configured to cool the air prior to the air entering the at least one adsorbent vessel.

17. A method comprising:
(a) forming a plurality of layers of adsorbent material in an adsorbent bed of each of at least one adsorbent vessel, the at least one adsorbent vessel having an inlet and an outlet, the plurality of layers of adsorbent material comprising a first layer formed from a first adsorbent material that is capable of selectively adsorbing at least one contaminant at a first temperature and selectively desorbing the at least one contaminant at a second temperature, and a second layer formed from a second adsorbent material that is capable of selectively adsorbing the at least one contaminant at the first temperature and selectively desorbing the at least one contaminant at a third temperature, wherein the first layer is located in an equilibrium zone for the adsorbent bed and the second layer is located in a mass transfer zone of the adsorbent bed, wherein the second and third temperatures are both higher than the first temperature, wherein the arrangement of the plurality of layers from the inlet to the outlet comprises the first layer, then the second layer, wherein the first adsorbent material has a greater adsorption capacity for the at least one contaminant than the second adsorbent material, and wherein the at least one contaminant comprises carbon dioxide.

18. The method of claim 17, further comprising:
(b) selectively adsorbing the at least one contaminant from a gaseous feed stream by flowing the gaseous feed stream at a feed temperature through at least one adsorbent vessel, thereby forming a purified stream; and
(c) regenerating the adsorbent bed by flowing a regeneration stream through the at least one adsorbent vessel in a direction opposite to that of the gaseous feed stream of step (b) at a regeneration temperature that is greater that the feed temperature, resulting in desorption of the at least one contaminant from the adsorbent bed to the regeneration stream.

19. The method of claim 17, further comprising:
(d) supplying the purified stream to a cryogenic distillation subsystem in fluid flow communication with the outlet of the at least one adsorbent vessel.

20. The method of claim 17, wherein the first adsorbent material has a greater adsorption capacity for carbon dioxide than the second adsorbent material.

* * * * *